United States Patent

[11] 3,631,819

| [72] | Inventor | Boleslaw Houchman |
| | | 11 Chatam Sofer Street, Tel Aviv, Israel |
| [21] | Appl. No. | 840,712 |
| [22] | Filed | July 10, 1969 |
| [45] | Patented | Jan. 4, 1972 |

[54] BAKING OVENS
6 Claims, 4 Drawing Figs.

[52] U.S. Cl. ................................................ 107/57 R,
107/55 B, 107/63, 165/146
[51] Int. Cl. ........................................................ A21b 1/10,
A21b 1/14
[50] Field of Search ............................................ 219/388;
165/133, 146; 107/55 R, 55 A, 55 B, 55 O, 56, 57
R, 57 A, 57 B; 263/8 R

[56] References Cited
UNITED STATES PATENTS

| 1,946,843 | 2/1934 | Elliot | 107/57 |
| 2,146,427 | 2/1939 | Hawkins | 219/388 |
| 2,454,370 | 11/1948 | Beaubien | 107/55 X |
| 2,718,854 | 9/1955 | Michaelis | 107/55 |
| 3,471,682 | 10/1969 | Hisey | 219/388 |

FOREIGN PATENTS

| 154,851 | 11/1938 | Austria | 165/146 |
| 583,117 | 10/1924 | France | 107/55 |

*Primary Examiner*—Billy J. Wilhite
*Assistant Examiner*—Alan I. Cantor
*Attorney*—Benjamin J. Barish

ABSTRACT: A baking oven comprises a heated tunnel divided into a plurality of zones, a conveyor passing through the zones, a burner for supplying hot gases to the zones, and two (or one) radiators for each zone. Each radiator includes a radiator surface element, some of which have a corrugated or ribbed surface and others of which have a flat surface.

INVENTOR
BOLESLAW HOUCHMAN

BY
ATTORNEY

BAKING OVENS

BACKGROUND OF THE INVENTION

1. Field of The Invention

The present invention relates to baking ovens, such as used for baking, on an industrial scale, bread, rolls, biscuits, crackers, and the like.

2. Description of The Prior Art

One known form of baking oven in which the invention may be used includes a heated tunnel divided into a plurality of zones, a conveyor for conveying the articles through the zones, a burner for supplying hot gases to the zones, and a pair of radiators (i.e. a lower one and an upper one) in each zone receiving the hot gases and heating the zone of the tunnel thereby. One or more zones may have only one radiator.

Some baking processes require a substantially uniform temperature throughout a complete zone, and others require a substantially uniform temperature throughout all the zones. Still other baking processes require different temperatures within the same zone; an example of the latter is in the baking of crackers, where a substantially higher temperature is required in the beginning of the first zone than in the rest of the first zone.

It is very difficult, if possible at all, in the known baking ovens of the foregoing type to provide uniform temperature throughout the same zone, or throughout all the zones, or a special temperature relationship within any one zone. This is because each zone is of substantial length, e.g. 4-5 meters, and therefore the hot gases have a considerable distance to travel from inlet to exit in any one zone, there being no independent control of the temperature or quantity of the hot gases within different parts of the zone. Where uniform temperature in a zone, or throughout all the zones, is required, or where special temperature relationships are needed in any particular zone, it is usually necessary to provide additional heaters, for example electrical heaters. This, however, increases the initial cost of the baking oven as well as its operating cost, and also complicates the controls that must be exercised while the baking oven is operating.

SUMMARY OF THE PRESENT INVENTION

The present invention provides a baking oven having advantages in the above respects, and also providing better fuel economy.

According to a broad aspect of the invention, there is provided a baking oven having a heated tunnel divided into a plurality of zones, a conveyor for conveying the articles to be heated through the zones, a burner for supplying hot gases to said zones, and a radiator for each zone, each radiator including a radiating surface element, at least one of said radiating surface elements having an undulating surface, and at least another having a flat surface. The temperature in each zone, or in any particular part of the zone, may therefore be varied by the appropriate design or selection of the radiating surface element, even though the quantity or the temperature of the hot gases supplied to the radiator zone is unaffected.

In one described embodiment, the undulating surface is formed by corrugations; and in another described embodiment it is formed by ribs.

According to a further important feature of the invention, one or more of the radiating surface elements may have its undulating surface divided into a plurality of sections of different radiating surface areas per unit area of the section. For example, where the undulating surface is formed by corrugations, the radiating surface element may be divided into a plurality of sections of different numbers of corrugation per unit area. Thus, if a uniform temperature is required throughout a particular zone, the radiating surface element can be increasingly corrugated from the beginning to the end of the element. On the other hand, if a sharply higher temperature is required at the beginning of a zone, or in the middle, the corresponding section of the radiating surface element may have a large number of corrugations as compared to the remaining sections. The same applies of course with respect to ribs.

The baking oven of the foregoing type includes an upper and a lower radiator, and further temperature control within any particular zone can be effected by providing the undulating surface to the upper and/or lower radiating surface element, or to sections thereof, as required by any particular baking process. Some zones, however, may have only one radiator.

According to a further feature, the radiating surface elements are attachable and detachable with respect to the radiators, enabling the temperature in any particular zone to be changed by attaching the appropriate radiating surface element for that zone.

Further features and advantages of the invention will be apparent from the description below.

BRIEF DESCRIPTION OF THE DRAWINGS

The invention is herein described, somewhat diagrammatically and by way of example only, with reference to the accompanying drawings, wherein.

DESCRIPTION OF THE PREFERRED EMBODIMENTS

Figure 1:
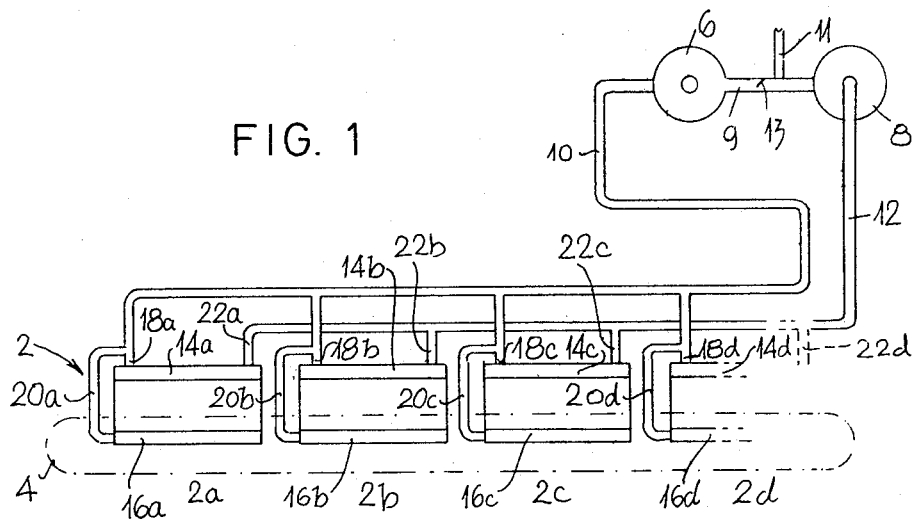
FIG. 1 diagrammatically illustrates a baking oven with respect to which the present invention is particularly directed.

The baking oven illustrated in FIG. 1 comprises a heated tunnel 2 divided into a plurality of zones, e.g. zones $2a-2d$. The articles to be heated (e.g. dough for baking bread, biscuits, crackers, or the like) are transported through the zones, from left to right, by means of an endless conveyor belt 4. Hot gases are supplied by means of a central burner 6 and a fan 8, the hot gases being circulated through an inlet duct 10 to all zones $2a-2d$ and being returned to the combustion chamber of the central burner 6 through return duct 12 via fan 8. Connecting duct 9 between fan 8 and burner 6 includes an exhaust duct 11 for exhausting some of the gases, and a damper 13 for controlling the amount of gases recirculated to the burner. While one burner is shown, there may be more.

In each of the zones $2a-2a$ of the heated tunnel 2, there is provided an upper radiator $14a-14d$ and a lower radiator $16a-16bq$. In some cases, only one radiator may be included in a zone. The upper radiators are supplied hot gases through inlets $18a-18d$ all connected to inlet duct 10, and the lower radiators are supplied hot gases through inlets $20a-20d$ also connected to inlet duct 10. The hot gases, after passing through their respective zones, leave the heated tunnel through outlet ducts $22a-22d$ connected to return duct 12.

As described earlier, in this type of oven it is very difficult, if possible at all, to provide for a uniform temperature within the same zone, or throughout all the zones, or to provide special temperature relationships in parts of one zone or among complete zones.

According to the invention, some or all of the radiators $14a-14d$ and $16a-16d$ include radiating surface elements $24a-24d$ and $26a-26d$ having an undulating surface. For example, it will be seen that in FIG. 2: the upper and lower radiating surface elements $24a, 26a$ are flat; elements $24b, 26b$ of the next zone are slightly corrugated; elements $24c, 26c$ of the next zone are more corrugated; and elements $24d, 26d$ are even more corrugated. Thus, for the same quantity and temperature of hot gases supplied to all of the zones, the temperature in any particular zone will be increased to the extent of the increased surface area provided by the undulating surface of the radiating surface elements in that zone.

Figure 3:
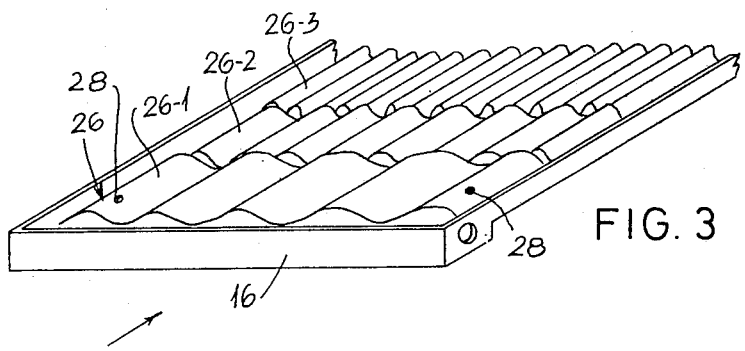
FIG. 3 illustrates one form of radiating surface element that may be used in the baking oven of FIGS. 1 and 2.

As shown in FIG. 3, each radiating surface element may be divided into a plurality of sections of different numbers of corrugations per unit area. Thus, in radiator 16 of FIG. 3, the radiating surface element 26 is divided into three sections, namely section 26-1 of few corrugations, section 26-3 of a larger number of corrugations, and section 26-3 of an even larger number of corrugations. The hot gases flow in the direction of the arrow. This arrangement thus tends to make the temperature within the section uniform throughout its length, notwithstanding the temperature drop of the hot gases as it flows through the radiator.

Figure 2:
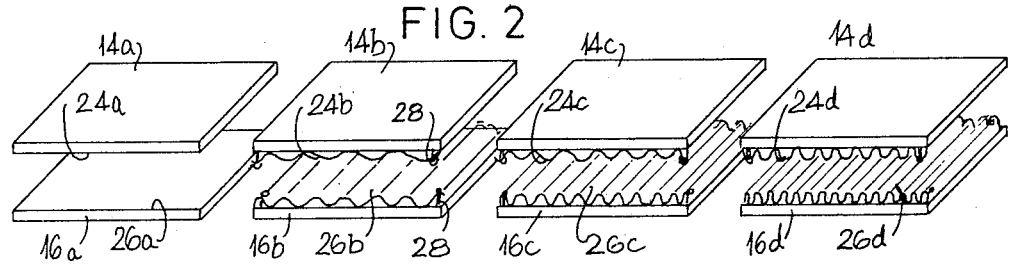
FIG. 2 illustrates a plurality of heated zones within the baking oven of FIG. 1 in accordance with the present invention.

The radiator in FIG. 3 is oriented with the corrugations extending in the direction of the gas flow, which arrangement can also be used in FIG. 2.

Figure 4:
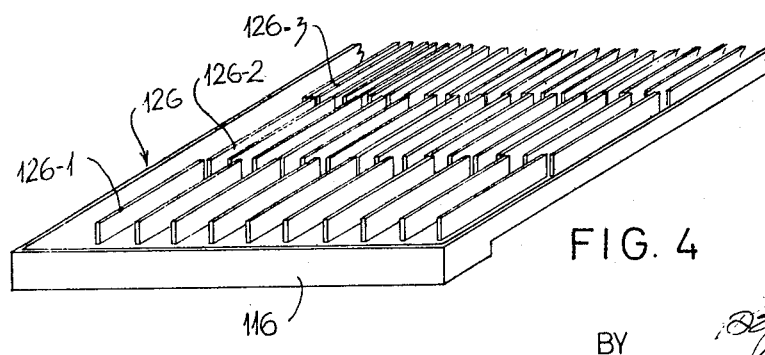
FIG. 4 illustrates another form of radiating surface element that may be used.

Instead of corrugating the radiating surface elements, they may also be formed with ribs. This is shown in FIG. 4, wherein it is seen that the radiator 116 includes a ribbed radiating surface element 126. The radiator of FIG. 4 is similar to that of FIG. 3 in that the radiating surface element is also divided into a plurality of sections, namely sections 126-1 of a relatively few number of ribs, section 126-2 of a greater number of ribs, and section 126-3 of an even greater number of ribs.

It will be appreciated that by appropriately corrugating or ribbing the radiating surface element, or providing another form of undulating surfaces for purposes of increasing its area per unit length and width, the temperature within any particular zone can be controlled so as to provide a uniform temperature throughout the zone, a uniform temperature throughout all the zones, a sharply rising temperature at the beginning of any zone, or any other temperature relationship that may be desired in any one zone or throughout all the zones, without using separate heaters for providing the special temperature relationships heretofore required. Providing the increased radiating surface area in some or all the zones also increases the heat exchange provided thereby, and therefore also the fuel economy.

Many variations, modifications and other applications of the illustrated embodiments will be apparent.

What is claimed is:

1. A baking oven having a heated tunnel divided into a plurality of zones, a conveyor for conveying the articles to be heated through said zones, a burner for supplying hot gases to said zones, at least some of said zones each including an upper and a lower radiator receiving hot gases from said burner, and means for effecting a predetermined temperature relationship in the respective zones, comprising, for each radiator, a radiating surface element radiating heat from the hot gases of its respective radiator into its respective zone, at least one of said radiators having an undulating radiating surface element providing a large radiating surface area per unit area of the radiator to produce a high temperature in its respective zone, at least one other of said radiators having an undulating radiating surface element providing a smaller radiating surface area per unit area of the radiator to produce a lower temperature in its respective zone, and at least one other of the remaining radiators having a flat radiating surface element providing the smallest radiating surface area per unit area of the radiator to produce an even lower temperature in its respective zone.

2. The baking oven as defined in claim 1, wherein said undulating surface is formed by corrugations.

3. The baking oven as defined in claim 1, wherein said undulating surface is formed by ribs.

4. A baking oven as defined in claim 1, wherein in at least one of said radiating surface elements, said undulating surface is divided into a plurality of sections of different radiating surface areas per unit area of the section.

5. The baking oven as defined in claim 1, wherein in at least one of said radiating surface elements, said undulating surface is divided into a plurality of sections of different numbers of corrugations per unit area of the section.

6. The baking oven as defined in claim 1, wherein in at least one of said radiating surface elements, said undulating surface is divided into a plurality of sections of different numbers of ribs per unit area of the section.

* * * * *